(No Model.)
J. FLESHER.
CROSSCUT SAW.
No. 417,862. Patented Dec. 24, 1889.
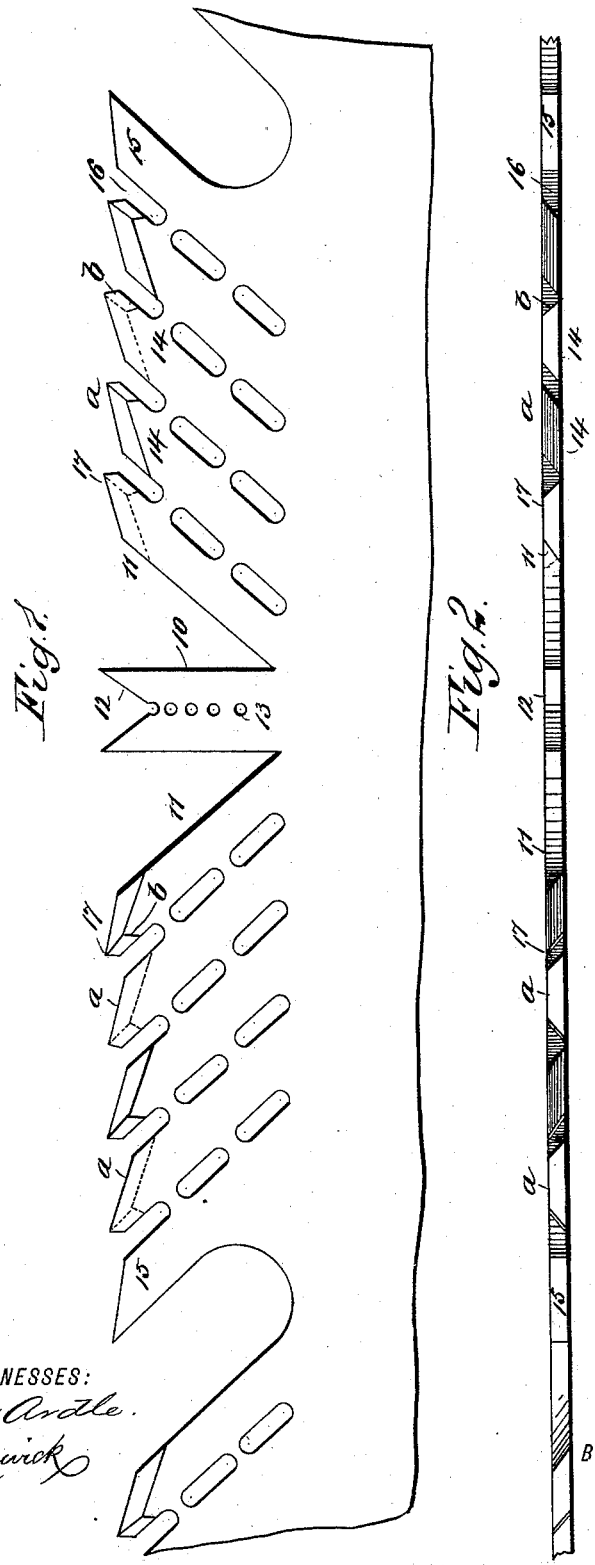
WITNESSES:
F. McArdle
C. Sedgwick
INVENTOR:
J. Flesher
BY Munn & Co.
ATTORNEYS.

UNITED STATES PATENT OFFICE.

JOHN FLESHER, OF EDGINGTON, ONTARIO, CANADA.

CROSSCUT-SAW.

SPECIFICATION forming part of Letters Patent No. 417,862, dated December 24, 1889.

Application filed April 22, 1889. Serial No. 308,209. (No model.)

*To all whom it may concern:*

Be it known that I, JOHN FLESHER, of Edgington, in the Province of Ontario and Dominion of Canada, have invented a new and useful Improvement in Crosscut-Saws, of which the following is a full, clear, and exact description.

My invention relates to an improvement in crosscut-saws, and has for its object to provide a saw capable of easy manipulation, which will cut fast and clean and not carry any of the sawdust back into the kerf made by the saw. And a further object of the invention is to provide a saw that will not jump or stagger when used upon hard wood or when striking and cutting through a knot; and also to so construct the saw that it will be essentially self-cleaning.

The invention consists in the novel construction and combination of the several parts, as will be hereinafter more fully set forth, and pointed out in the claims.

Reference is to be had to the accompanying drawings, forming a part of this specification, in which similar letters and figures of reference indicate corresponding parts in both the views.

Figure 1 is an elevation of a portion of the saw-blade, and Fig. 2 is a top side view.

In carrying out the invention the saw is provided with a central drag-tooth 10 and a recess 11 at each side of the said tooth, the outer walls of the said recesses being inclined in opposite directions, or in the direction of the respective ends of the saw-blade. In the nose of the drag-tooth 10 an essentially V-shaped recess 12 is produced, whereby two angular cutting-edges are formed, and a longitudinal series of apertures 13 are transversely made in the body of the said tooth, as shown in Fig. 1. At each side of the central drag-tooth the other teeth of the saw are arranged in blocks of five, the blocks comprising four cutting-teeth 14 and an end drag-tooth 15, having a square nose, as best illustrated in Fig. 1. The noses of the cutting-teeth are straight and flat, as illustrated at *a*, and each alternate nose is beveled in the opposite direction, whereby one tooth cuts one wall of the kerf and the next tooth the opposite wall, and so on throughout the stroke, the central surface being plowed out by the central drag-tooth and the end drag-tooth of each block. The cutting-teeth and drag-tooth of each block are separated by a suitable gullet 16, and the ends of the cutting-teeth facing the direction of inclination are beveled, as shown at *b* in Fig. 1, thereby producing an acute angular cutting-edge 17.

By means of the shape and arrangement of the several teeth it will be observed that the block of teeth at one side of the center will cut when the saw is carried in one direction, and the opposite series of blocks will operate when the direction is reversed. Thus the teeth do not in operation carry back with them any of the sawdust created by the formation of the kerf.

Having thus described my invention, I claim as new and desire to secure by Letters Patent—

1. As an improved article of manufacture, a crosscut-saw comprising a central drag-tooth, at each side of which a recess is formed, the outer walls whereof incline in opposite directions, and blocks of teeth at each side of the central drag-tooth separated from said drag-tooth by the inclined recesses, and inclined, respectively, in the direction of the ends of the saw-blade, said blocks comprising four cutting-teeth and one end drag-tooth, substantially as shown and described.

2. As an improved article of manufacture, a saw-blade for crosscut-saws, having a central drag-tooth provided with an essentially V-shaped recess in its nose, and an angular recess at each side of the central drag-tooth, the end walls of which recesses incline in opposite directions, and teeth arranged at each side of the central drag-tooth in blocks of five, and separated from said drag-tooth by the inclined recesses comprising four cutting-teeth and one end drag-tooth, the nose of each alternate cutting-tooth being beveled in an opposite direction, substantially as and for the purpose specified.

3. As an improved article of manufacture, a saw-blade for crosscut-saws, provided with a central drag-tooth having formed in its nose an essentially V-shaped recess, and an angular recess at each side of the central drag-tooth, the end walls of which recesses are inclined in opposite directions, blocks of teeth at each side of the central drag-tooth separated from said drag tooth by the inclined recesses, and comprising four cutting-teeth and one end drag-tooth, the nose of each alternate cutting-tooth being beveled in an opposite direction to incline at opposite sides of the nose, and the end of the nose of each of the said cutting-teeth facing the end of the saw-blade being beveled to form a decided cutting-edge, substantially as shown and described, whereby in producing the kerf one cutting-tooth will form one wall of the kerf and the next cutting-tooth the opposed wall, and the drag-teeth will plow or remove the central surface from the kerf, as and for the purpose specified.

JOHN FLESHER.

Witnesses:
R. H. STEWART,
P. M. CURRY,
*Both of Perry Sound, Ontario, Canada.*